United States Patent [19]

Boyd

[11] Patent Number: 4,605,110
[45] Date of Patent: Aug. 12, 1986

[54] BRAKE ACTUATOR FOR BICYCLES AND THE LIKE

[76] Inventor: Winnett Boyd, 107 Victoria Place, Bobcaygeon, Ontario, Canada, K0M 1A0

[21] Appl. No.: 730,993

[22] Filed: May 6, 1985

[51] Int. Cl.⁴ .................. B60K 41/26; F16D 41/34
[52] U.S. Cl. .......................... 192/5; 192/36; 192/41 S; 192/80; 192/81 C; 188/82.5
[58] Field of Search ............... 192/5, 36, 41 S, 80, 192/81 C; 188/24.17, 82.5, 82.6

[56] References Cited

U.S. PATENT DOCUMENTS

| | | | |
|---|---|---|---|
| 1,488,714 | 4/1924 | Schurmann | 192/5 |
| 2,940,563 | 6/1960 | Milenkovic et al. | 192/5 |
| 4,199,046 | 4/1980 | Boyd | 192/41 S X |
| 4,313,530 | 2/1982 | Boyd | 192/41 S |

FOREIGN PATENT DOCUMENTS

| | | | |
|---|---|---|---|
| 300578 | 9/1932 | Italy | 192/5 |
| 456997 | 4/1950 | Italy | 188/24.17 |
| 120305 | 11/1918 | United Kingdom | 192/5 |

*Primary Examiner*—Kenneth J. Dorner
*Assistant Examiner*—David A. Testardi
*Attorney, Agent, or Firm*—Ridout & Maybee

[57] ABSTRACT

In a crankshaft operated brake actuating device for bicycles, a brake operating lever extends through the lower bracket from a yoke contacting the crankshaft. A light weight spring clutch transmits torque from the crankshaft to the lever upon back pedalling, and reaction from the torque causes the lever to tilt and engage a strap clutch locking the lever to the crankshaft as the braking forces are increased.

4 Claims, 2 Drawing Figures

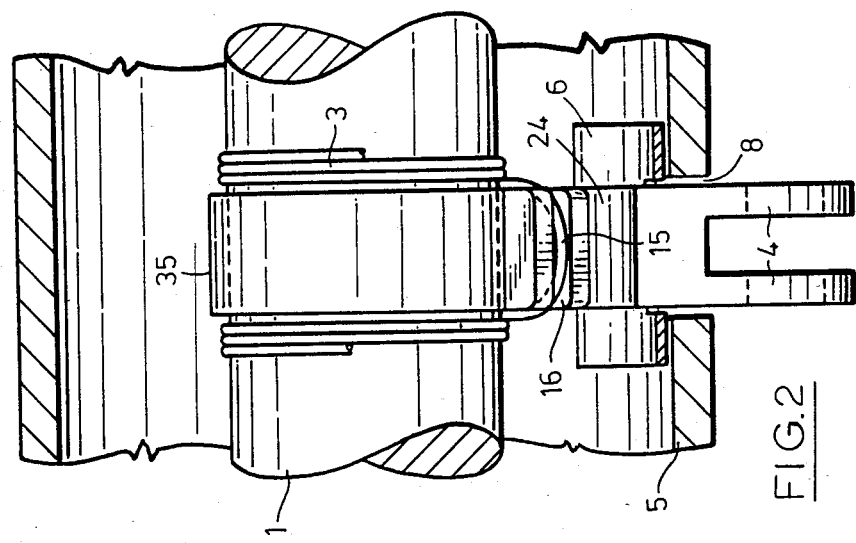
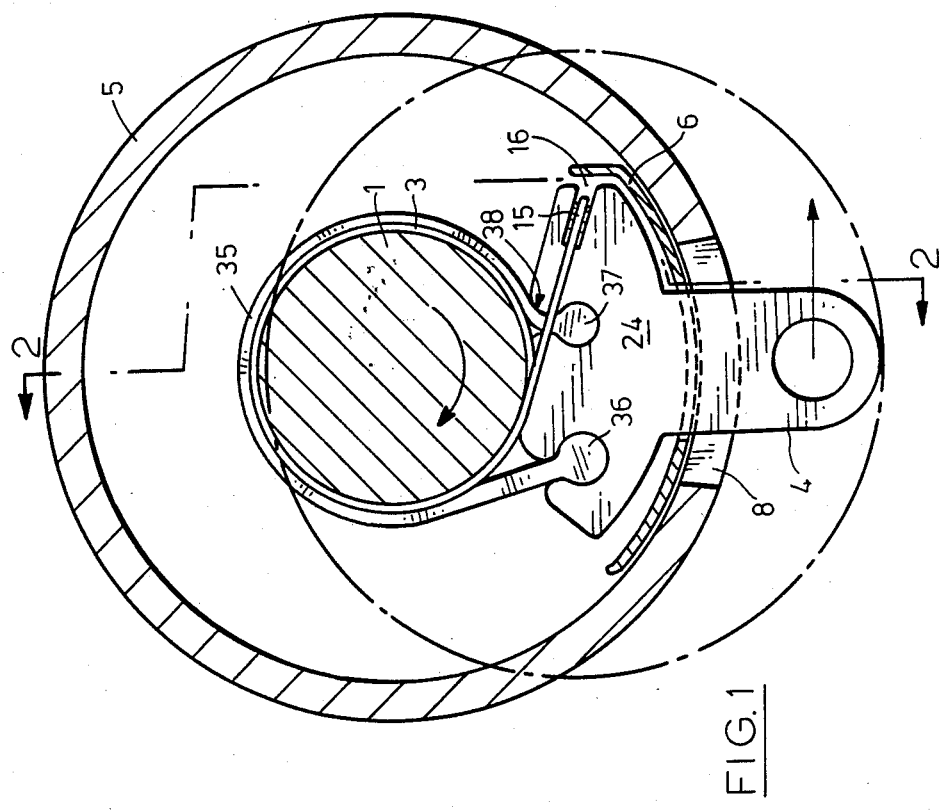

BRAKE ACTUATOR FOR BICYCLES AND THE LIKE

FIELD OF THE INVENTION

This invention relates to brake actuating means for pedal propelled vehicles such as bicycles. Although the invention is also applicable to pedal propelled vehicles having more than two wheels, e.g. tricycles, it will for convenience hereinafter be explained and described in relation to bicycles, which are by far the most common for of such vehicles, without thereby implying any limitation of the scope of the invention to bicycles.

BACKGROUND OF THE INVENTION AND ART STATEMENT

This invention relates to a development of the brake actuating means described in my U.S. Pat. Nos. 4,199,046 and 4,313,530, which are the most pertinent art known to me. A further impression of the state of the art relating to actuators of the same general type may be obtained by considering the references discussed in the specifications of those patents or cited during their prosecution.

In the actuators described in my prior patents, a one-way clutch element acting on the pedal crankshaft of a bicycle is formed by a spiral coil spring having a central bight engaging a yoke through which braking forces are transmitted, and oppositely handed spiral coils surrounding the crankshaft and extending axially outward along the crankshaft from opposite sides of the yoke. Outward portions of the coils are of relatively lighter gauge and are normally the only portions to engage the crankshaft, thus reducing frictional drag. Development has shown that this arrangement can operate very satisfactorily with very little drag during forward pedalling of the bicycle whilst requiring very little rearward angular motion of the pedals to produce engagement.

Much thought has been given to alternatives to this spring type brake actuator as described in the above patents. Because of the space limitations in the small bottom brackets (the pedal crankshaft housing) of non-North American manufactured bicycles, I do not know of any alternative of comparable performance to my spring type actuator for such bicycles. However, for those North American manufactured bicycles that have large bottom brackets (approximately 2" inside diameter), I have devised an alternative to the above coil type brake actuator which is described in my copending U.S. patent application Ser. No. 674,292, filed Nov. 23, 1984. In the arrangement described in that application, a light spring clutch acts as a pilot actuator closing the jaws of a main clutch mechanism which then operates in a somewhat similar manner to a stillson wrench and locks an actuating lever to the pedal crankshaft. I have now developed a further alternative arrangement in which a light spring clutch acts directly of the actuating lever to provide an initial braking force the reaction from which actuates a main clutch mechanism to enable transmission of greater braking forces than could be sustained by the spring alone.

SUMMARY OF THE INVENTION

According to the invention, there is provided a device for operating a brake of a pedal operated vehicle comprising a brake operating lever projecting through an opening in a pedal crankshaft housing of the vehicle, and two oppositely wound spring coils, connected at a bight engaging the lever, and concentrically surrounding and frictionally engaging a pedal crankshaft within the housing, with an inner end of the lever engaging the circumference of the crankshaft, wherein a flexible strap is provided extending in a loop from the lever, around the crankshaft and back to the lever, a wrapping surface is formed on the inner end of the lever whereby tilting of the lever in one direction relative to the periphery of the crankshaft causes the strap to wrap onto the wrapping surface and reduce the length of the loop so that the strap grips the crankshaft and locks the lever to the latter, the bight engaging the lever adjacent its inner end so that the spring coils extend from the bight in the direction of crankshaft motion associated with back pedalling, and said bight provides a fulcrum for tilting of the lever relative to the crankshaft in said one direction such that the strap grips the crankshaft and locks the lever to the latter.

In contrast to my previous actuator mechanisms, in which light weight coil springs cause engagement of heavier duty clutch elements such as heavier spring coils or hinged links, and these latter establish a rigid connection between the pedal crankshaft and a brake actuating lever, the springs in the present invention act directly on the actuating lever, yet can still be of light weight, since reaction from the lever causes the latter to tilt and engage the main clutch formed by the strap, thus preventing excessive loading of the spring.

Further features of the invention will become apparent from the following description with reference to the accompanying drawings.

SHORT DESCRIPTION OF THE DRAWINGS

In the drawings:

FIG. 1 is a section through the bottom bracket of a bicycle to which the invention is applied, longitudinally of the bicycle; and FIG. 2 is a fragmentary section through the bottom bracket, transversely to the bicycle in the line A—A in FIG. 1.

DESCRIPTION OF THE PREFERRED EMBODIMENT

Referring to the drawings, the environment in which the actuator is applied can be readily understood by reference to my U.S. Pat. Nos. 4,199,046 and 4,313,530, the disclosures of which are incorporated herein by reference. Similar reference numerals are used to indicate like parts to those appearing in those patents, where appropriate.

As compared to the embodiment of FIG. 1 of Pat. No. 4,313,520, the spring coils 3 are of simplified construction. The spring wire is of uniform and relatively small cross-section throughout, and may be of conventional circular cross-section. Although only parts of the coils are shown, each will have a number of turns, typically eleven. A bight portion 15 connecting the opposite handed spring coils 3 is engaged in a groove 16 which is formed in the outer surface of one end of a yoke 24 formed at the inner end of an actuator lever 4, the outer end of which in turn is connected to a brake linkage (not shown). The lever 4 passes through a slot 8 in the lower bracket 5 of a bicycle, the slot being sealed against the ingress of dirt by a shield 6 surrounding the lever within the bracket. The yoke of the inner end of the lever 4 rests against a pedal crankshaft 1 housed within the bracket. A flexible steel strap 35 extends around the periphery of the crankshaft between enlarged end portions 36 and 37 snugly received within reentrant slots in the yoke 24. Preferably the strap is configured so that it is normally a loose fit on the crankshaft 1 which can rotate freely within it. In a preferred arrangement, the thickness of the strap is gradually tapered between the end portion 36 and the end portion 37, so that the portion nearest the end 36 has greater tensile strength, and the portion nearer the end 37 has greater flexibility.

In use, and during forward pedalling conditions, under which the crankshaft 1 rotates in a counterclockwise direction as seen in FIG. 1, it rotates freely within the strap 35 and the coils 3, with minimal frictional drag. In response to back pedalling, causing the crankshaft to rotate clockwise as shown by the arrow in FIG. 1, the slight frictional engagement with the coils 3 causes the latter to wrap tightly onto the crankshaft so that the bight 15 pulls against the yoke 24, causing the lever 4 to rotate with the shaft. As the lever rotates, its outer end pulls on the brake linkage tending to apply the brakes, and the reaction from the linkage, shown by the arrow extending to the right from the lever 4, tilts the lever about a fulcrum formed by the bight 15. This tilting causes the strap 35 adjacent the end 37 to wrap onto a wrapping surface 38 formed on the yoke, thus reducing the effective length of the loop and tightening the strap onto the crankshaft 1. As the strap engages, the wrapping surface 38 becomes the fulcrum sustaining the forces applied by the lever, and a very large mechanical advantage becomes available for applying tension to the end 36 of the strap, which tension can readily be made sufficient to provide radial pressures causing steel to steel seizure between the strap and the crankshaft, even in the presence of lubricants.

It will be understood that, unlike the arrangement in my prior patents and application discussed above, the relatively light duty pilot coils of the spring clutch participate directly in the transmission of braking forces, with the main strap clutch becoming effective as braking forces increase, instead of merely acting to apply the main clutch. This can help minimize the amount of rearward pedal movement required to initiate brake application. Likewise, release of the main clutch during brake release is not dependent on prior release of the pilot clutch, both clutches being instead released simultaneously. This tends to minimize the forward pedalling motion required to release the clutch, which in turn facilitates the application of measures to prevent unwanted brake lock-up.

The device is readily assembled in bottom brackets having a reasonable clearance around the crankshaft. The lever 4 and the associated shield 6, springs 3 and strap 35 are assembled in the relationship shown, and inserted into the bracket 5 from one end. As can be seen from the chain line in FIG. 1, the assembly has overall dimensions comparable to the internal dimensions of the bracket, and any slight excess is easily accommodated either by compressing the springs or tilting the assembly so that it may be moved into the bracket until the lever 4 drops through the opening 8. The crankshaft may then be passed through the coils 3 and the strap 35.

I believe that the best anchorage between the strap 35 and the yoke 24 is provided by the enlarged ends 36 and 37 forged on the strap as shown, and since forging is required to form these ends, no significant extra expense is involved in tapering the strap as described so the portion adjacent end 36 has improved tensile strength to resist the higher tensile forces applied to that end of the strap, and the portion adjacent the end 37 has improved flexibility to facilitate wrapping onto the surface 38 and reduce the possibility of fatigue failure. However, other methods of anchorage of the strap could be used and the taper could be omitted. Moreover, whilst a single loop has been described, multiple loops of the strap would be possible, formed for example by a coil spring similar to the heavier gauge portions of the spring shown in my U.S. Pat. No. 4,199,046 but secured at both ends to the yoke.

I claim:

1. A device for operating a brake of a pedal operated vehicle, comprising a brake operating lever projecting through an opening in a pedal crankshaft housing of the vehicle, and two oppositely wound spring coils connected at a bight engaging the lever, and concentrically surrounding and frictionally engaging a pedal crankshaft within the housing, with an inner end of the lever engaging the circumference of the crankshaft, wherein a flexible strap is provided extending in a loop from the lever, around the crankshaft and back to the lever, a wrapping surface is formed on the inner end of the lever whereby tilting of the lever in one direction relative to the periphery of the crankshaft causes the strap to wrap onto the wrapping surface and reduce the length of the loop so that the strap grips the crankshaft and locks the lever to the latter, the bight engaging the lever adjacent its inner end so that the spring coils extend from the bight in the direction of crankshaft motion associated with back pedalling, and said bight provides a fulcrum for tilting of the lever relative to the crankshaft in said one direction such that the strap grips the crankshaft and locks the lever to the latter.

2. A device according to claim 1, wherein the inner end of the lever is formed as a yoke engaging a part of the periphery of the crankshaft, one end of the strap is attached to one end of the yoke, the bight joining the spring coils engages the other end of the yoke, the other end of the strap is attached to the yoke intermediate of said one end and the bight, and the wrapping surface is formed on the yoke between said other end and the bight.

3. A device according to claim 1, wherein the strap is connected at opposite ends to the lever by forming enlargements at each end which are received on a reentrant recess in the latter, the axes of the enlargements and of the recesses extending parallel to the axis of the crankshaft.

4. A device according to claim 1, wherein the strap tapers in thickness around the loop, with its thinner end adjacent the wrapping surface.

* * * * *